(12) United States Patent
Chang

(10) Patent No.: US 9,309,927 B2
(45) Date of Patent: Apr. 12, 2016

(54) ROTATIONAL DRIVESHAFT COUPLER TO FACILITATE A SEAL WITH STATIC CONTACTS

(76) Inventor: Chung Chang, Houston, TX (US)

(*) Notice: Subject to any disclaimer, the term of this patent is extended or adjusted under 35 U.S.C. 154(b) by 988 days.

(21) Appl. No.: 13/235,378

(22) Filed: Sep. 17, 2011

(65) Prior Publication Data

US 2013/0068049 A1   Mar. 21, 2013

(51) Int. Cl.
*F16J 15/50* (2006.01)
*F16D 3/33* (2006.01)
*F16D 3/84* (2006.01)

(52) U.S. Cl.
CPC .. *F16D 3/33* (2013.01); *F16D 3/84* (2013.01); *F16J 15/50* (2013.01); *Y10T 74/18408* (2015.01)

(58) Field of Classification Search
USPC ............ 464/29, 103; 74/69, 48, 50, 17.8; 277/315; 29/888, DIG. 28; 403/DIG. 1
See application file for complete search history.

(56) References Cited

U.S. PATENT DOCUMENTS

| | | | |
|---|---|---|---|
| 1,826,703 A * | 10/1931 | Batts ............................. 74/69 |
| 2,545,562 A * | 3/1951 | Thiel, Jr. ............... F16J 15/525 74/17.8 X |
| 2,610,871 A | 9/1952 | Woodson |
| 2,899,808 A | 8/1959 | Berens |
| 3,048,413 A | 8/1962 | Wood |
| 3,049,931 A * | 8/1962 | Lang, Jr. ............... F16J 15/525 74/17.8 X |
| 3,378,710 A | 4/1968 | Martin |
| 3,877,259 A | 4/1975 | Bishop |
| 3,931,720 A * | 1/1976 | Buhrer ............................. 464/103 |
| 3,932,068 A | 1/1976 | Zimmermann |
| 3,933,052 A * | 1/1976 | Coles ............... F16J 15/006 74/17.8 X |
| 4,378,220 A | 3/1983 | Seppala |
| 4,817,966 A | 4/1989 | Borowski |
| 4,928,978 A | 5/1990 | Shaffer |
| 5,332,236 A | 7/1994 | Kastuhara |
| 6,478,681 B1 * | 11/2002 | Overaker et al. ............... 464/29 |
| 7,528,514 B2 * | 5/2009 | Cruz et al. |

* cited by examiner

*Primary Examiner* — Gregory Binda
(74) *Attorney, Agent, or Firm* — DH Associates; David C. Lee

(57) ABSTRACT

A rotational driveshaft coupler that converts a rotating shaft motion into two orthogonal oscillations and at the opposite side of this coupler, a third oscillator converts the oscillations back to a rotational motion. At least one slip free seal can be constructed from the coupler to its housing to separate the space occupied by the output shaft from the space occupied by the input shaft. Each of the three oscillating motions can be guided by bearings, gears and tracks to reduce frictions and heat generation. Permanent magnet pairs are used to prevent bifurcation and force the output shaft to follow the rotation direction of the input shaft. Unlike in magnetic coupling, the torque transmission here is direct.

8 Claims, 5 Drawing Sheets

ROTATIONAL DRIVESHAFT COUPLER TO FACILITATE A SEAL WITH STATIC CONTACTS

FIELD OF THE INVENTION

The present invention relates an engineering method and apparatus of inserting at least one perfect seal while transmitting driveshaft rotational motion from an enclosed space surrounding the input shaft to the adjacent space surrounding the output shaft or vice versa. The present invention protects critical machine components from environmental contaminations, corrosions as well as electrical short due to invading fluids or moistures.

BACKGROUND OF THE INVENTION

Mechanical face seals are well known for providing machine protection from severe service environments and allow a rotary shaft to extend from inside a stationary housing to the outside of its housing. However, wearing, corrosion, and large fluctuations in pressure and temperature can often result in face seal failures. Through years, numerous engineering efforts have been made to improve the face seal design assembly in order to increase its reliability and reduce its maintenance cost.

The other known solution is to use magnetic coupling with an air gap to isolate a motor from its load. The fundamental limits of machine using magnetic coupling are its limited torque load, coupling size and heat generation at the coupler. However, there are a lot of industrial machine applications that require high torque and sophisticated controls but lack room to implement the magnetic coupling; or the machine itself is subject to very high external pressure or is under such operating conditions that make the scheduled maintenance services difficult.

The nuclear power plant disaster due to failed backup generators after the big earthquake in Japan in 2011 has urgently raised the need for new generator and pump design that can survive flooding of sea water. The mechanical seal plays a critical role in both waterproof generator and pump design.

Both mechanical face seal and magnetic coupling are suitable for certain types of operating environments and conditions but they are generally not a problem free solution. Nonetheless, overcoming the rotary shaft seal problem is technically challenging. There are many industries including automobile, pump, electrical power generation, marine vessels, aerospace, oilfield services, refinery, chemical plants, food processing, etc. that still need a better seal solution that can transfer rotational motion from an enclosed space to its adjoining spaces or vice versa.

The fundamental mathematical problem in replacing a traditional face seal solution of a rotating shaft is to avoid sealing the infinite periodical boundary conditions that occur between the rotating shaft and the stationary housing, which prevents one from bonding or clamping any seal at this interface.

SUMMARY OF THE INVENTION

The objective of the present invention is to provide a bonded or clamped seal solution for a rotating shaft and its enclosed housing by converting the rotating motion of an input shaft into two orthogonal oscillating motions via a contacting and non-rotating driveshaft coupler and then using a third oscillator at the opposite side of this coupler to convert the oscillations back into the rotation of an output shaft. The third oscillator is mounted on the coupler and moves perpendicular to the motion of the coupler. There is a solid wall which separates the input shaft from the output shaft at the center of the driveshaft coupler.

Because oscillators do not generate infinite periodical boundary conditions, therefore, one can construct at least one bonded or clamped seal between the driveshaft coupler and its enclosed housing. This perfect seal and driveshaft coupler not only protect the sensitive elements of the machine from the external environments and substances, but also allow the transmission of a rotational motion to drive an external load. Each of the oscillating motions can be guided by linear motion bearing, bushing, gear or rollers and tracks combination to reduce frictions and to prevent heat generations. Without extreme temperature at the driveshaft coupler, rubber like materials, composites or the likes can be used as the sealing materials.

In applications involving frequent starts and stops driving shaft, magnets attached to the wings of the oscillator at each side of the driveshaft coupler can be used to prevent output shaft rotational bifurcations from happening when the off centered pin at the end of input shaft starts at two particular angular positions; for example, at 0 and 180 degrees according to the present invention, and the output shaft will always be forced to follow the input shaft to rotate in the same direction. Rotational bifurcation is a perturbation force at the start of the motion of a dynamic system that can generate two different motion behaviors.

To summarize the mechanical transmission of the present invention: an off centered pin at one end of an input rotational shaft starts both a vertical and a horizontal oscillations at the driveshaft coupler, and a second vertical oscillator mounted at the opposite end of the driveshaft coupler forces an linked output shaft to rotate in a synchronized manner with the input shaft.

The novelty, traits, other objects and functionality of the present invention will be clearly comprehended by referring to the following detailed description in conjunction with the accompanying drawings.

DETAILED DESCRIPTION OF THE INVENTION

Figure 1:
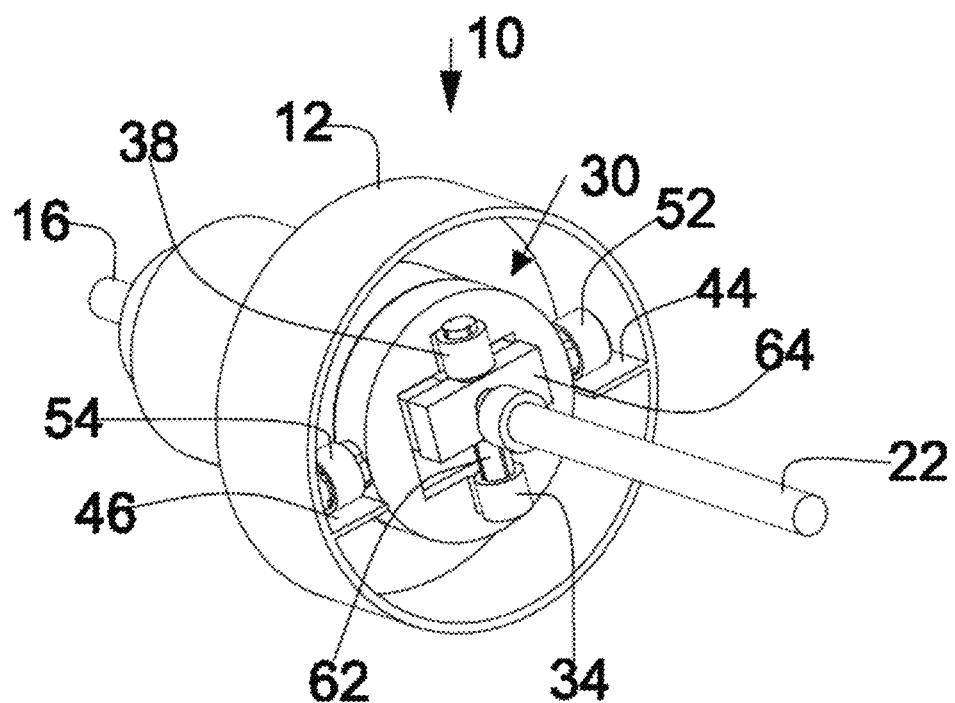
FIG. 1 is a perspective view of the mechanical assembly of a rotational driveshaft coupler.

The essential components of the rotational driveshaft coupler are a feature to engage an input shaft, an oscillation converter to convert rotation to perpendicular oscillating motion at the coupler, a feature to engage an output shaft, a seal and housing. Showing in FIG. 1 is the perspective view of the mechanical assembly of the rotational driveshaft coupler. In order to obtain a clear picture of the rotational driveshaft coupler invention, the rear portion of the housing 12 which may include a driving motor is left out.

Referring now to the current invention 10 in more detail, in FIG. 1 the unit 30 is the oscillation converter which includes a vertical oscillator with wing 64 and a shaft 62 that moves vertically inside two linear bearing/busing 38 and 34. However, not shown in the figure is the similar or identical vertical oscillator at the opposite end of the oscillation converter 30. Unit 30 itself moves horizontally inside another two linear bearing/bushing 52 and 54 which are fixed and welded to the inside of housing 12 by the two supporting plates 44 and 46. Unit 30 can also move horizontally using low friction components such as wheels, gear, tracks, busing or bearing anchored to the roof and floor of the housing 12. Linear bearing/bushing is a one dimensional linear motion device which will not allow the shaft to rotate while in motion. If one prefers to use plain bushing, the dual shaft oscillator design option should be considered in order to prevent shaft rotation. Shown also in the figure are the input rotating shaft 22 and the output rotating shaft 16. It will be described later how the output rotating shaft 16 and pin 18 engage the oscillation converter 30. The input rotating shaft 22 uses the same engaging mechanism.

Figure 2:
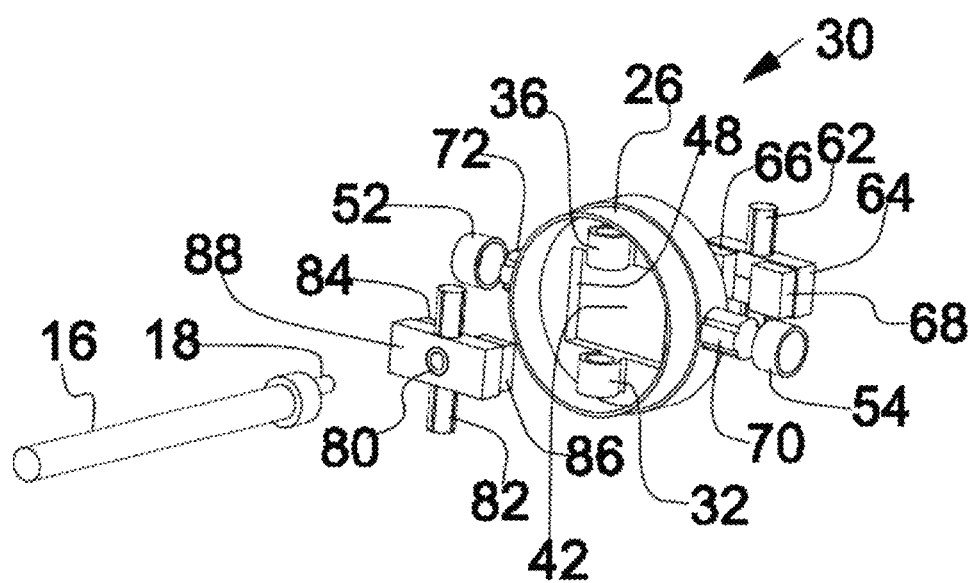
FIG. 2 is an exploded view of the oscillation converter of the present invention.

FIG. 2 shows the exploded view of the oscillation converter 30 together with the output shaft 16. The output shaft 16 has an extruded pin 18 at one end that can engage the vertical oscillator with wing 88 and shaft 82 through a ball bearing 80 embedded in the center of this oscillator. Two permanent magnets 84 and 86 are mounted underneath the wing 88 of this vertical oscillator. Magnets 84 and 86 are extended inside an extruded cut 48 in the center of the oscillator converter 30 to interact with magnets 66 and 68 at the opposite side of the oscillation converter 30 through a thin non-magnetic wall 42 to synchronize the two vertical oscillating motions. The thin wall 42 and the body of oscillation converter 30 can be made of special non-magnetic materials, for example, Hastelloy, Titanium, etc. to allow the magnetic attractive force to go through. The extruded boss 26 is used to mount a seal 14 shown in FIG. 3 and FIG. 4. Linear bearing/bushing 32 and 36 guide the vertical oscillation shaft 82, and linear bearing/busing 52 and 54 guide the horizontal oscillation shaft 70 and 72 of the oscillation converter 30.

Figure 3:
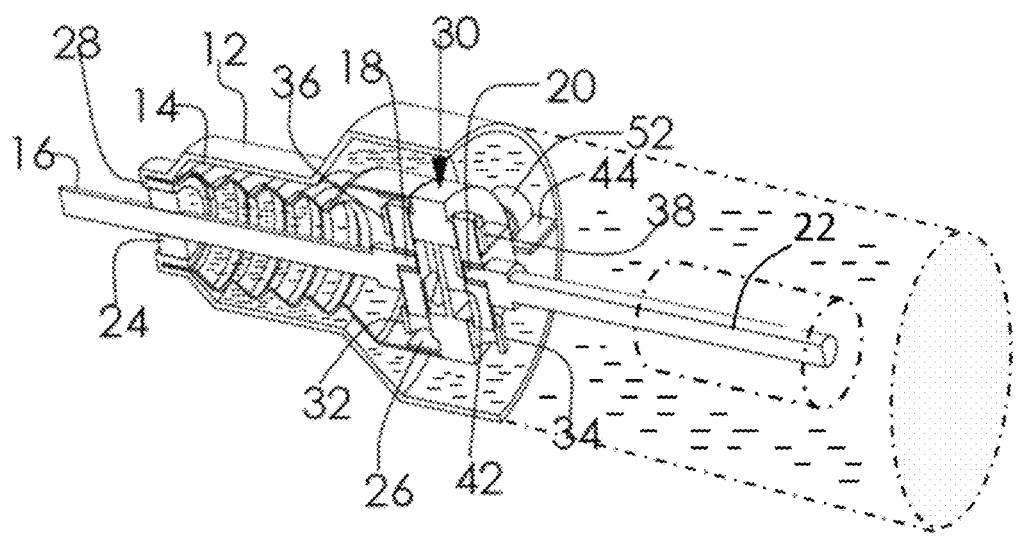
FIG. 3 is a sectional view of the mechanical assembly of the present invention.

In more detail, referring to the invention shown in FIG. 3 the output shaft 16 is supported at the mouth 28 of the housing 12 by a thrust bearing 24. A corrugated seal 14 has its smaller diameter end bonded at the mouth 28 of the housing 12 and the other end bonded to the extrusion 26 at the oscillation converter 30. Extrusion 26 can also be seen in FIG. 2. The space occupied by the output shaft is enclosed by the thrust bearing 24, the seal 14 and the oscillation converter 30 that has a thin wall 42 in the middle. The thrust bearing 24 is attached to the mouth 28 of the housing 12. Therefore, there is a perfectly bonded isolation between the space occupied by the output shaft and the space occupied by the input shaft. Although it is not critical, a face seal can still be implemented at the mouth 28 of the housing 12 to provide additional protection.

Shown also in FIG. 3 are the two vertical oscillators which are built symmetrically with respect to the thin wall 42 of the oscillation converter 30. The input shaft 22 with pin 20 engages another vertical oscillator that slides inside the bearing/busing 34 and 38 at the input side of the oscillation converter 30. The torque generated by the off centered pin 20 of the input shaft 22 will start all three oscillating motions and the linked output shaft 16 will be forced passively to follow the rotation of the input shaft 22. Not shown here is the motor that anchors and drives the input rotational shaft 22. For high pressure applications, one can use pressure balance fluids 25, shown in dashed lines, in the compartments at both sides of the bonded or clamped seal to prevent large deformation of seal.

Figure 4:
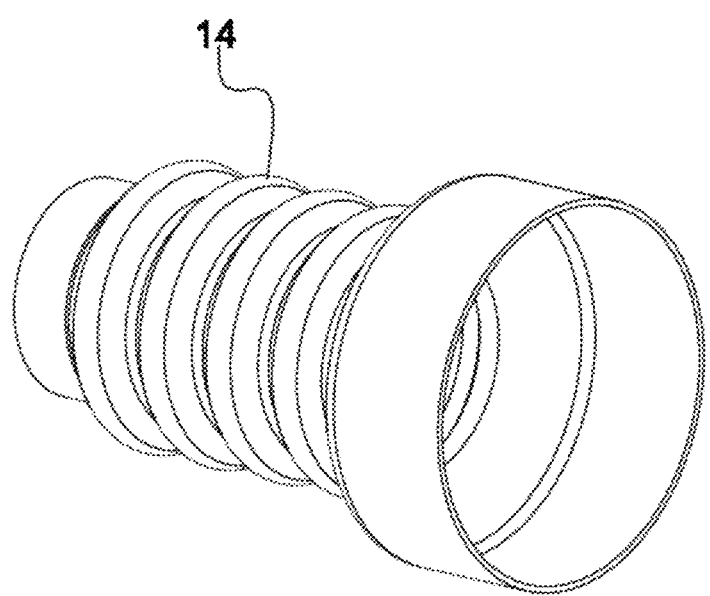
FIG. 4 is a perspective view of a seal of the present invention.

FIG. 4 shows the corrugated seal 14 that is bonded to the mouth 28 in housing 12 and also at the boss 26 of the oscillation converter 30 in FIG. 3. Seal 14 will be subject to horizontal oscillations. Therefore, using a rubber like soft material, similar composites or the likes, in addition to the elongation and corrugation, will reduce stress on seal 14 and prolong its life.

Figure 5A:
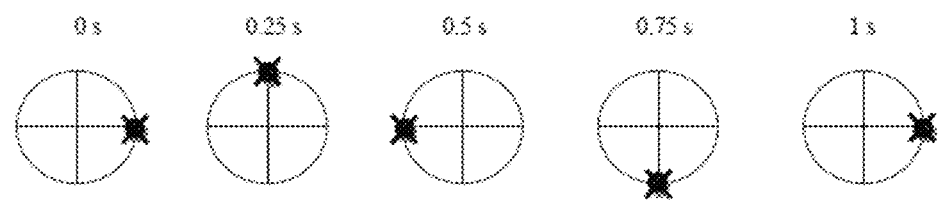
FIGS. 5 (*a*) and (*b*) are illustrations of the bifurcations of the angular pin positions of both the input shaft and the output shaft on a unit circle.
Figure 5B:
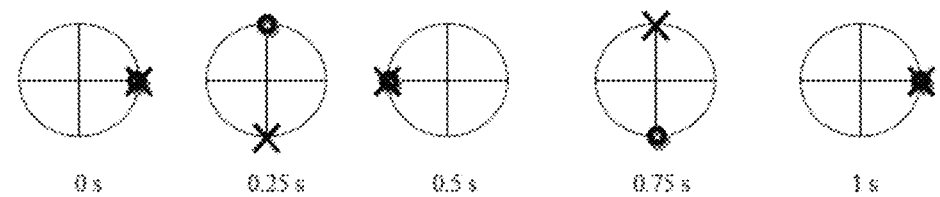

In order to explain the rotating direction bifurcation happening at either of the two horizontal start positions of the off centered pin of the input shaft at 0 and 180 degrees which are the two intersecting points by the horizontal axis when one looks at the off centered pin positions from the axial direction of the input shaft, FIGS. 5 $a$ and $b$ plot both allowable rotational positions in time for the pin positions of the input shaft and output shaft along a unit circle starting at 0 degree. Using 60 rpm as an example, the donut symbol ○ is the angular pin position of the input shaft and the cross symbol X is the angular pin position of the output shaft.

Referring now to FIGS. 5 $a$ and $b$. FIG. 5$a$ shows the two shafts rotate in sync and FIG. 5$b$ shows the two shafts rotating in the opposition direction, one in a clockwise direction and the other in the counterclockwise direction and both rotating possibilities are mechanically allowed. For a frequent stops and starts rotating application, one needs to prevent the possibility of creating unpredictable output shaft rotating direction when the pin position of the input shaft occasionally starts particularly at these two positions. The preferred solution as explained earlier is to use permanent magnet pairs to force the two vertical oscillators to move in the same direction regardless of the input shaft pin starting position.

Of course there are other mechanical devices, for example, special clutches or ratchets, etc. that can be mounted along either the input shaft, output shaft or both, to force its shafts to rotate in a chosen direction. Other solutions include controlling the servo motor to force the input shaft to stop only at positions other than the two bifurcation positions. Therefore, with the help of other unidirectional mechanical device or method our invention can also work without using the magnets.

It is understood that the two horizontal bifurcation positions at 0 and 180 degrees are due to the particular arrangement of the orthogonal oscillators in the rotational driveshaft coupler. It can be at any other angular positions depending on how one rotates the coupler assembly relative to its housing.

To summarize the rotational transmission: an off centered pin 20 at the end of an input rotational shaft 22 starts two orthogonal oscillation motions; one is the horizontal oscillation of the oscillation convertor 30 and the other is the vertical oscillation of an vertical oscillator with wing 64 and shaft 62 that moves vertically inside linear bearing/bushing 34 and 38. The oscillation converter 30 with shaft 70 and 72 moves horizontally inside linear bearing/bearing 52 and 54 which are firmly attached to the inside of housing 12 through plates 44 and 46. At the opposite side of the oscillation converter 30, a second vertical oscillator with wing 88 and shaft 82 that moves vertically inside linear bearing/bushing 32 and 36 engages the pin 18 of the output shaft 16 to force the output shaft 16 to rotate in sync with the input shaft 22.

The advantages of the present invention include, without limitation, for the first time enabling a bonded or clamped seal while transmitting rotational shaft motion from inside an enclosed space to its adjoining space. Unlike the magnetic coupler, there is a direct one-to-one torque transmission ratio without slips. The output rotational speed control is also much simpler than the magnetic coupler. With a seal and improved reliability one can find application of this new invention in many challenging industrial environments.

This invention focuses on the concept of mechanical design and there is no effort in miniaturizing the size of the design. One can easily imagine the use of a driveshaft coupler in combination with any other mechanical devices, for example, gear box, ratchet, clutches, etc. For high pressure applications, one can use pressure balance fluids in the compartments at both sides of the bonded or clamped seal to prevent large deformation of seal.

In broad embodiment, the present invention is a method as well an apparatus to provide the possibility of constructing a seal with static contacts while transmitting rotational shaft motion from its enclosed space to its adjoining space or vice versa. This invention and technology have the potential to revolutionize many of our industries that currently use face seal and magnetic coupling in their products.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A coupling method for converting an input shaft rotation to orthogonal oscillations at a contacting and non-rotating mechanical coupler then to an output shaft rotation; said coupling method comprising:
   a) joining an input shaft with a non-rotating oscillator on an input end of said mechanical coupler;
   b) joining an output shaft with a symmetric oscillator on an output end of said mechanical coupler; and
   c) converting the rotational motion of said input shaft into orthogonal oscillations using a plurality of oscillators which includes said oscillators in a) and b) at said mechanical coupler
   wherein converting rotations to oscillations can allow for a bonded seal between said mechanical coupler and its housing.

2. A method of claim 1 further comprising bonding or clamping a seal between said mechanical coupler and said housing to isolate space occupied by said input shaft from space occupied by said output shaft.

3. A method of claim 1 further comprising forcing said output shaft to follow said input shaft by using magnets to prevent rotational bifurcation of said output shaft at two initial angular starting positions of said input shaft.

4. A method of claim 1 further comprising using low friction components to guide said oscillators at both said input end and said output end of said mechanical coupler.

5. A method of claim 1 further comprising a fluid isolating wall between said input shaft and said output shaft at said mechanical coupler.

6. A method of claim 1 wherein said input shaft and said output shaft have extruded pins.

7. A method of claim 1 wherein said oscillators at both said input end and said output end of said mechanical coupler have low friction components to engage said input shaft and said output shaft.

8. A method of claim 1 wherein said input shaft and output shaft are surrounded by pressure balancing fluid.

* * * * *